United States Patent [19]

Hennekes et al.

[11] Patent Number: 4,512,709
[45] Date of Patent: Apr. 23, 1985

[54] ROBOT TOOLCHANGER SYSTEM

[75] Inventors: Daniel M. Hennekes, Morrow, Ohio; Richard A. Kolde, Ft. Thomas, Ky.; David E. Suica, Lebanon, Ohio

[73] Assignee: Cincinnati Milacron Inc., Cincinnati, Ohio

[21] Appl. No.: 516,972

[22] Filed: Jul. 25, 1983

[51] Int. Cl.³ ............................................... B66C 1/00
[52] U.S. Cl. .................................. 414/729; 248/122; 294/86.4; 403/338; 403/374; 901/41
[58] Field of Search ................. 414/729, 735; 901/29, 901/30, 41, 50; 269/234; 81/57.24, 57.35, 57.4; 248/122; 403/338, 374; 294/81 SF, 86 R; 279/89

[56] References Cited

U.S. PATENT DOCUMENTS

| | | | |
|---|---|---|---|
| 4,227,853 | 10/1980 | Woodford | 901/30 X |
| 4,281,447 | 8/1981 | Miller et al. | 901/30 X |
| 4,309,809 | 1/1982 | Yokoe et al. | 901/30 X |
| 4,372,728 | 2/1983 | Murakami | 901/29 X |

*Primary Examiner*—Robert J. Spar
*Assistant Examiner*—Donald W. Underwood
*Attorney, Agent, or Firm*—Thomas M. Farrell

[57] ABSTRACT

A robot toolchanger system is disclosed, where an adapter unit is mounted to the end effector of a robot. The housing of the adapter unit has central opening for receiving a T-shaped member which is affixed to a common toolbase, applied to a variety of tools. The crossbar of the T-shaped member is engaged by a slide movable in the housing in reversing directions to lock and unlock the tool with respect to the robot end effector.

4 Claims, 10 Drawing Figures

ROBOT TOOLCHANGER SYSTEM

BACKGROUND OF THE INVENTION

The invention relates generally to toolchanger systems, wherein a machine mechanism may utilize an interchangeable plurality of tools. More specifically, the invention relates to robot systems, such as industrial robot arms, which have a plurality of elements movable with respect to a robot base. In such robot arms, the last element in the system, i.e., the wrist, generally has a movable end effector to which is attached a gripper or some other tool.

While robots have the inherent flexibility of being reprogrammed for different jobs, they generally carry one special tool concerning the immediate task to be performed. At time of reprogramming or changeover of jobs, the robot tooling may be replaced by a maintenance operator as a new task is to be undertaken.

With the idea of improving productivity of a robot machine, applicants have determined that it is a desirable feature to be able to interchange multiple tool types with a given robot end effector, during the working cycle on a given workpiece, and it is to this task that they have directed their efforts. Applicants have also determined that it is a desirable feature, in a replaceable tool system, to have the capability to enable the robot to automatically interchange a plurality of tools, without the need for human intervention.

Applicants have considered various power means for clamping a tool, and have determined that the tool retention system should tned to be bistable, i.e., the mechanism should remain in either the locked or unlocked position, in the event of a power failure.

SUMMARY OF THE INVENTION

The invention is shown embodied in a robot having a movable end effector, wherein a toolchanger comprises, in part, an adapter unit affixed to the end effector. The adapter unit has a housing with means for locating and securing the housing on the end effector, and a means for locating and releasably retaining a tool base on the housing is embodied therein. A common tool base is affixed to a plurality of tools to be releasably retained with the adapter unit, and a retention member affixed to the tool base cooperates with the adapter unit for holding the tool base and tool in position with the adapter unit.

It is an object of the invention to provide a robot toolchanger which will releasably retain a plurality of tools which may be interchanged with a tool storage module.

It is another object of the invention to provide a robot toolchanger which will tend to retain the tool in the event of a power failure.

DESCRIPTION OF THE PREFERRED EMBODIMENT

Figure 1:
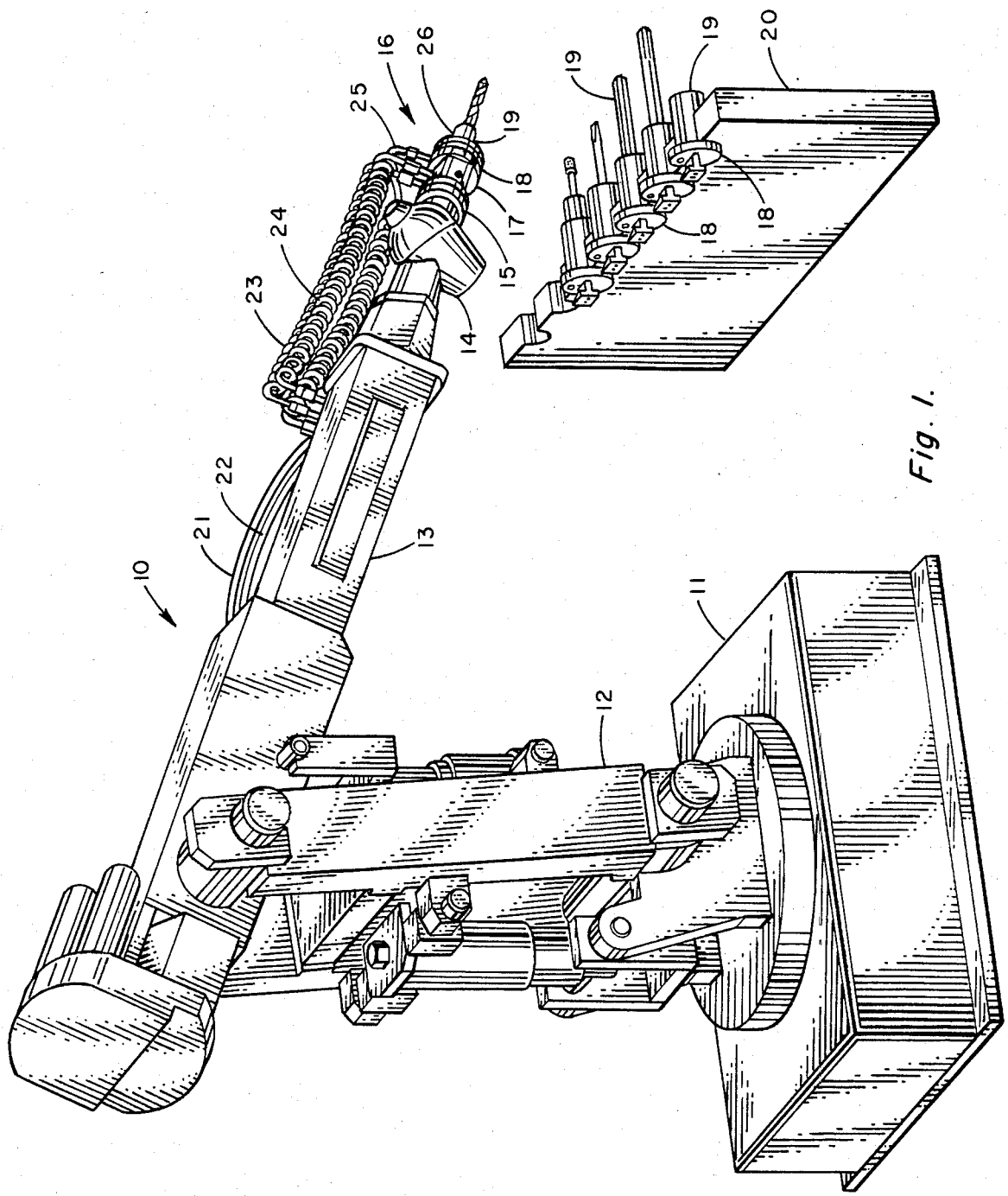
FIG. 1 is a perspective view of robot having a toolchanger, and a rack with a stored plurality of tools.

FIG. 1 of the drawings depicts an industrial robot 10, having a base 11; movable upper arm 12; movable forearm 13; and, articulatable wrist 14. The robot 10 could be any of a variety of robots produced, including coordinate movement robots and jointed arm robots, such as the one shown, which is described in U.S. Pat. No. 269,681 of Morser et al entitled "Robot Arm". The wrist 14 could also be a variety of mechanisms, but the wrist 14 shown is that of U.S. Pat. No. 4,068,536, of Stackhouse, entitled "Manipulator". The end effector 15 of the wrist unit 14 is capable of three-axis movement, so that a spherical path may be covered by the effector 15.

The end effector 15 carries a robot toolchanger 16 comprised generally of an adapter unit 17 which is affixed to the end effector 15, and a separable, or releasably retained, tool base 18 which is affixed integrally to a desired tool 19. A family of tools 19 are shown situated on a representative tool rack 20, and each distinct tool 19 has a common tool base 18 to enable the tool 19 to be located and retained on the toolchanger adapter unit 17. Fluid pressure lines 21,22 are brought from a fluid source to a junction block (not shown) on the side of the robot forearm. Flexible fluid lines 23,24 are brought from the junction block to the adapter unit 17 for powering a linear actuator to clamp and unclamp the tool bases 18. An additional fluid line 25 is brought to the front plate 26 of the adapter unit to provide a pressure line for those tools which are to be fluid powered.

Figure 2:
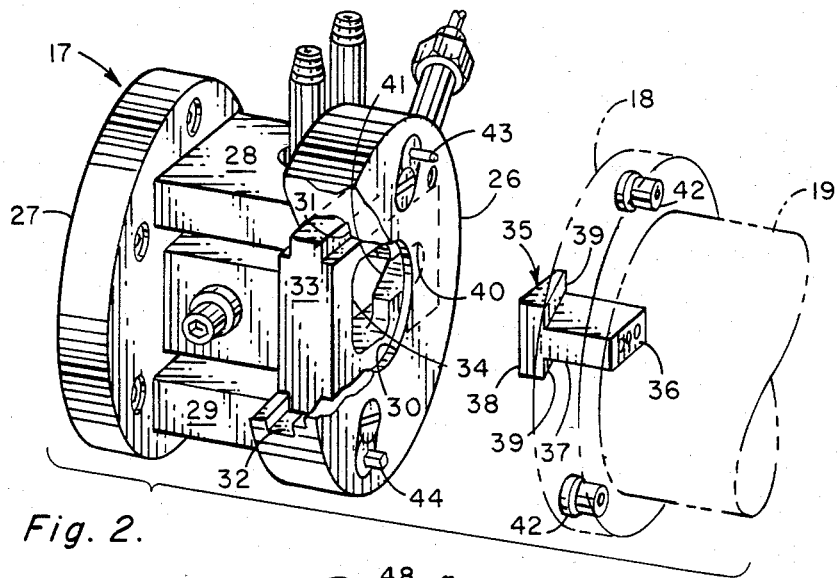
FIG. 2 is a perspective view in partial section of a toolchanger adapter unit, illustrating the locking slide in the open position, and the tool retention member separated from the adapter unit.

FIG. 2 illustrates a perspective view of the adapter unit 17, which is comprised of a pair of spaced-apart circular plates 26,27 rigidly tied to one another through spaced-apart rectangular blocks 28,29 forming walls for the unit 17. A fluid powered linear actuator 60 (see FIG. 3) is located on the rear base plate 27 of the unit. The front plate 26 of the adapter unit 17 is provided with a central opening 30, and parallel slots 31,32 are provided across the plate 26 to guide a locking slide 33 which is moved radially in the plate 26 by the actuator 60. The locking slide 33 has a squared central aperture 34 in line with the plate opening 30 in the position shown, for receiving a T-shaped retention member 35 secured to the tool base 18. The T-member 35 has its bottom surface 36, i.e, the bottom of the T stem 37, secured to the tool base 18 by screws (see FIG. 6) longitudinally received through the stem 37. The cross bar 38 of the T-member 35 extends toward the adapter unit 17 and the cross bar 38 is beveled at its underside to provide ramp surfaces 39 which cooperate with the locking slide 33. The locking slide 33 has a central slot 40 to accomodate the stem 37 of the T-member 35, and cooperating ramp surfaces 41 are provided on the central portion of the locking slide 33 to engage the ramp surfaces 39 of the cross bar 38 in a forked, clevis manner with a wedging action. In the event of power failure on the linear actuator 60, the tool 19 will tend to remain in the locked or clamped position, due to the essentially irreversible nature of the locking slide 33/T-member 35 engagement. The tool base 18 is provided with a pair of hardened steel bushings 42, which are accurately positioned in the tool base 18, and the bushings 42 are received on a pair of locating pins 43,44 secured to and extending from, the front plate 26 of the adapter unit 17. The reception of the bushings 42 on the pins 43,44 assures accurate registration of the tool 19 before the locking slide 35 is moved into the clamping position.

Figure 3:
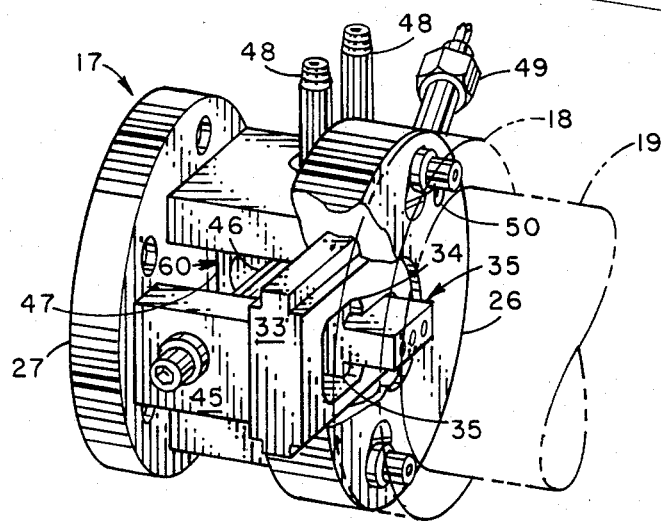
FIG. 3 a perspective view of the adapter unit of FIG. 2, illustrating the locking slide in the closed position, and the tool retention member secured by the locking slide.
Figure 5:
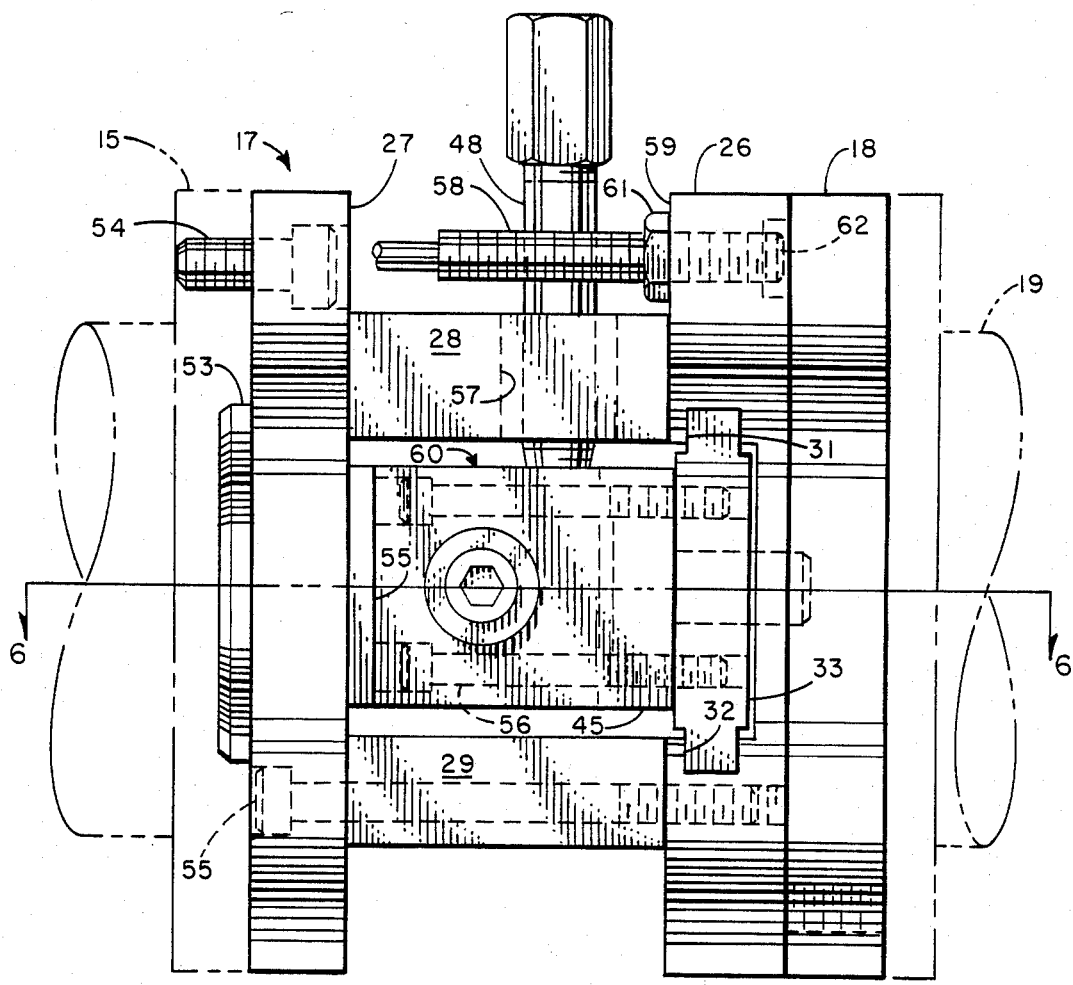
FIG. 5 is a side elevation view of the adapter unit of FIG. 2.
Figure 6:
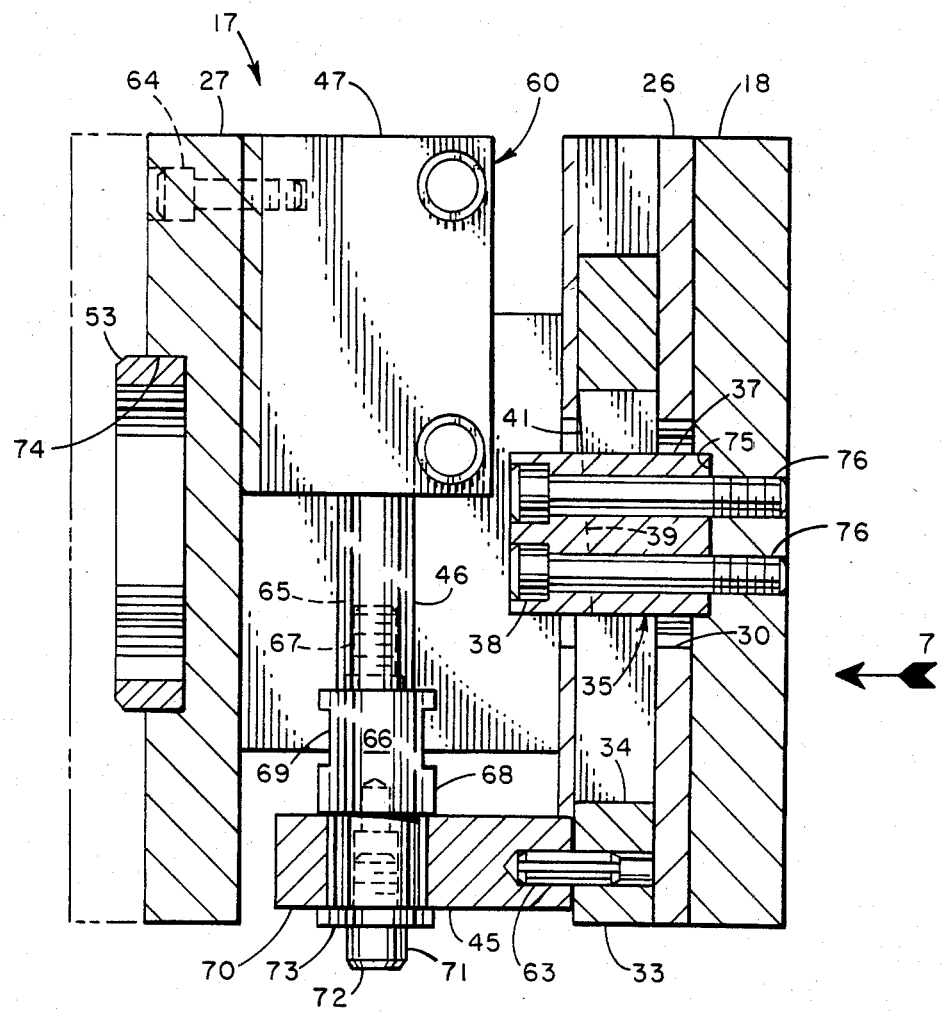
FIG. 6 is a plan section of the toolchanger unit taken along the line 6—6 of FIG. 5.

FIG. 3 illustrates that the locking slide 33 is provided with yoke block 45, extending transversely from its rear surface toward the rear plate 27, and the yoke block 45 is affixed to the piston rod 46 of the linear actuator 60 (see FIGS. 5 and 6). The cylinder 47 of the actuator 60 is affixed to the rear plate 27 of the adapter unit 17. Once the tool base 18 is registered on the front plate 26 of the adapter unit 17, and the cross bar 38 of the T-member 35 is received through the central aperture 34 of the locking slide 33, the slide 33 is moved in a radial direction relative to the front plate 26, and the tool 19 is retained in position on the adapter unit 17. A pair of pipes 48 extend from the cylinder 47 of the linear actuator 60, to connect the fluid lines 23,24 (see FIG. 1). A fluid fitting 49 is received in the front plate 26, and interdrilling connects the fitting 49 to a front hole 50 which is aligned with a mating fluid port (not shown) in the tool base 18 to provide fluid power for a tool, when desired.

Figure 4:
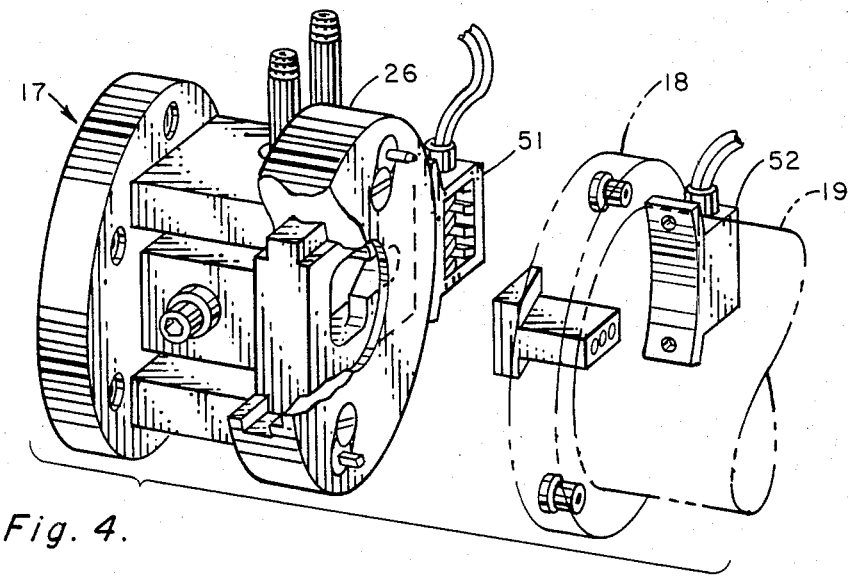
FIG. 4 is an alternate embodiment of the adapter unit of FIG. 2, illustrating that a separable electrical connection unit may be affixed to both the adapter unit and the releasable tool.

FIG. 4 depicts the elements of FIG. 2, with the exception that the fluid fitting 49 is replaced by an electrical connector 51 on the front plate 26 of the adapter unit 17, and a mating electrical connector 52 is provided on the tool base 18 for conducting electrical signals, if desired, to the tool 19 when the tool base 18 is clamped in position on the adapter unit 17.

The side elevation view of FIG. 5 depicts the adapter unit 17 and tool base 18 in assembly. The rear plate 27 of the adapter unit 17 is located by a pilot diameter 53 and secured by screws 54 to the end effector 15. The front and rear plates 26,27 of the unit are tied together by screws 55 extending through the parallel spaced-apart blocks 28,29, to form a rigid structure. The linear actuator 60 is centrally located between the blocks 28,29, and is mounted to a pad 55 on the rear plate 27. The locking slide 33 is generally rectangular in cross-section, having accurate edges, machined to a close fit in guide slots 31,32 provided in the front plate 26. The yoke block 45 is secured to the locking slide 33 by a pair of screws 56 so that movement of the linear actuator 60 will cause the yoke block 45 and slide 33 to move in unison, in a radial direction, relative to the circular front plate 26. The rigid fluid pipes 48 extend from the linear actuator 60, with one pipe 48 extending through a clearance hole 57 in the top block 28. The tool base 18 is shown clamped to the front plate 26 of the adapter unit 17, and the tool base 18 carries any one of a variety of tools 19. A proximity switch 58 is threadably received through the back face 59 of the front plate 26 and secured by a locknut 61. The tip 62 of the proximity switch 58 is recessed into the front plate 26 a slight amount, and is capable of sensing the presence or absence of a tool base 18.

The plan section of FIG. 6 illustrates the adapter unit 17 having its locking slide 33 moved to the locked position. At such position, the T-member 35 is securely held within the central opening 30 of the front plate 26 by a wedging action on the cross bar 38. The tool base 18 is received on the front plate 26 of the adapter unit 17. The T-member 35 extends through the central opening 30 of the plate 26 and the aperture 34 of the locking slide 33 is shifted out of alignment with the opening 30. The locking slide 33 is aligned with the yoke block 45 by a roll pin 63 extending into both 33,45. The linear actuator 60 has a cylinder 47 affixed to the rear plate 27 by cap screws 64, and the piston rod 46, extending from the cylinder 47, has a threaded end hole 65 which threadably receives a rod adapter 66. The adapter 66 has a threaded portion 67, and a cylindrical body portion 68 having machined wrench flats 69. An integral pilot diameter 70 extends through a bore 71 in the yoke block 45 and a cap screw 72 and washer 73 affix the adapter 66 to the yoke block 45. The pilot diameter 53 of the rear plate 27 is a cylindrical ring, pressed into a blind bore 74 in the plate 27. The T-member 35 is located with its stem 37 in a machined recess 75 in the tool base 18. and a pair of cap screws 76 hold the T-member 35 to the base 18. In the position shown, the ramp surfaces 41 of the locking slide 33 are engaged with the ramp surfaces 39 of the T-member 35, so that the tool base 18 may not be withdrawn and separated from the adapter unit 17.

Figures 7, 8:
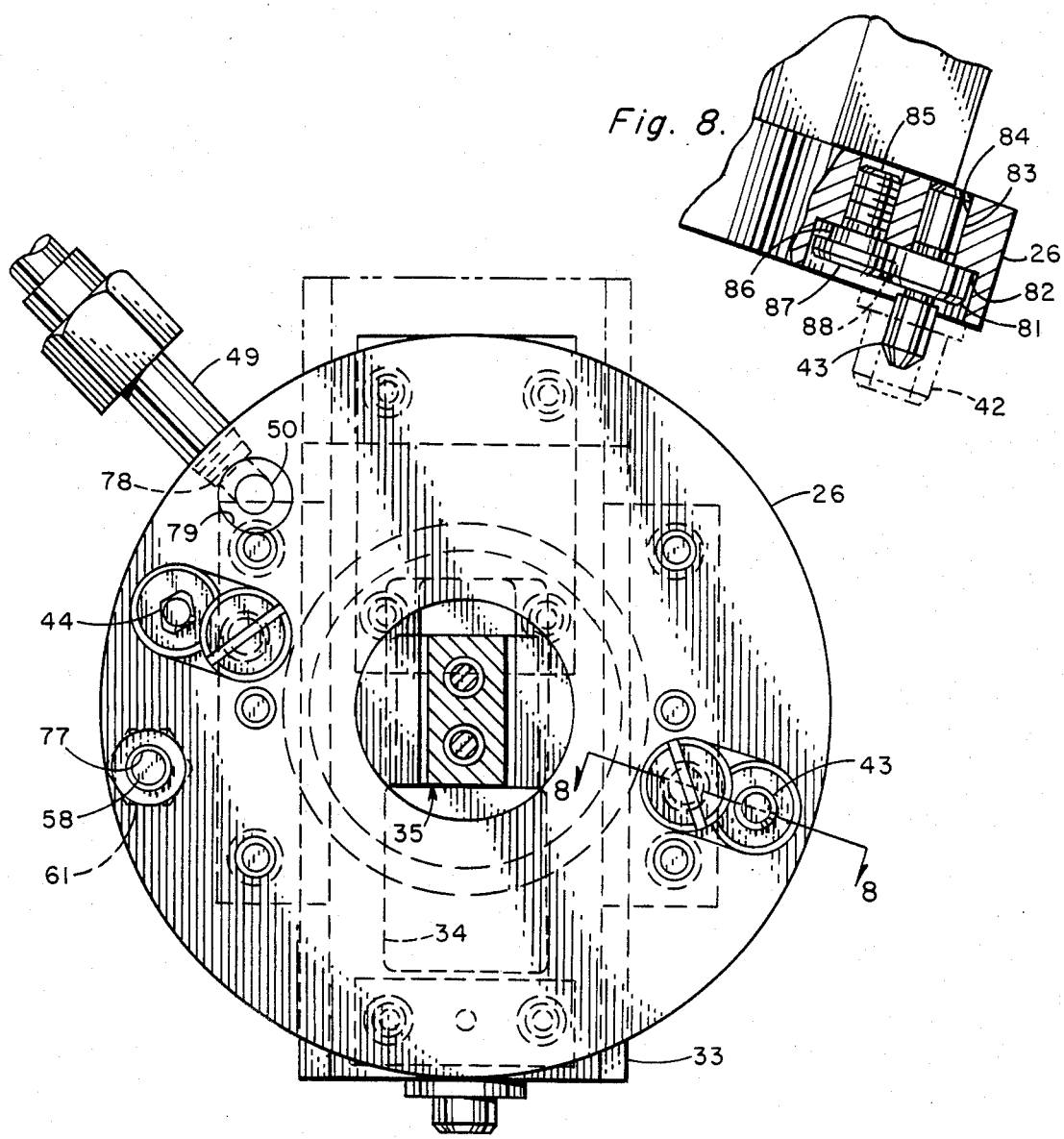
FIG. 7 is a front elevation view taken in the direction of arrow 7 of FIG. 6, depicting the tool retention member in partial section.
FIG. 8 is a section through the adapter locating pin taken along the line 8—8 of FIG. 7.

Referring to FIG. 7, the slide 33 must be shifted to the phantom position shown in order to align the slide aperture 34 with the T-member 35 for tool separation to occur. The proximity switch 58 (FIG. 5) is shown extending into a relief portion 77 in the front plate 26 and held in position by the locknut 61. The fluid fitting 49 is received in a pipe-threaded hole 78 in the circumference of the front plate 26, and the hole 78 is ported into a front hole 50 and counterbore 79, which receives an O-ring 80 for sealing purposes (see FIG. 10). The pair of locating pins 43,44 are provided on the front plate 26, one pin 43 being cylindrical, and the other pin 44 being diamond-shaped in cross section. The section of FIG. 8 is typical for both pins 43,44, as both receive a hardened steel bushing 42 of the tool base 18. FIG. 8 shows that the locating pin 43 has a flange 81 seated against a milled counterbore 82, and a pilot diameter 83 of the pin 43 extends into a pilot hole 84 in the front plate 26. The locating pin 43 is restrained from axial movement by a captivating screw 85, which has a shoulder diameter 86 adjacent the pin flange 81, and the larger head 87 of the screw 85 is received in a notch 88 in the flange 81. The screw 85 is threadably received in the front plate 26 to secure the locating pin 43.

Figure 10:
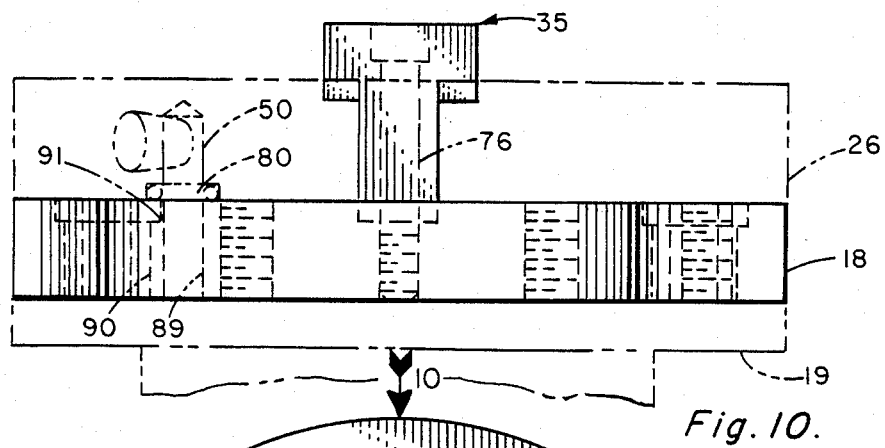
FIG. 10 is a plan view of the tool base of FIG. 9.
Figure 9:
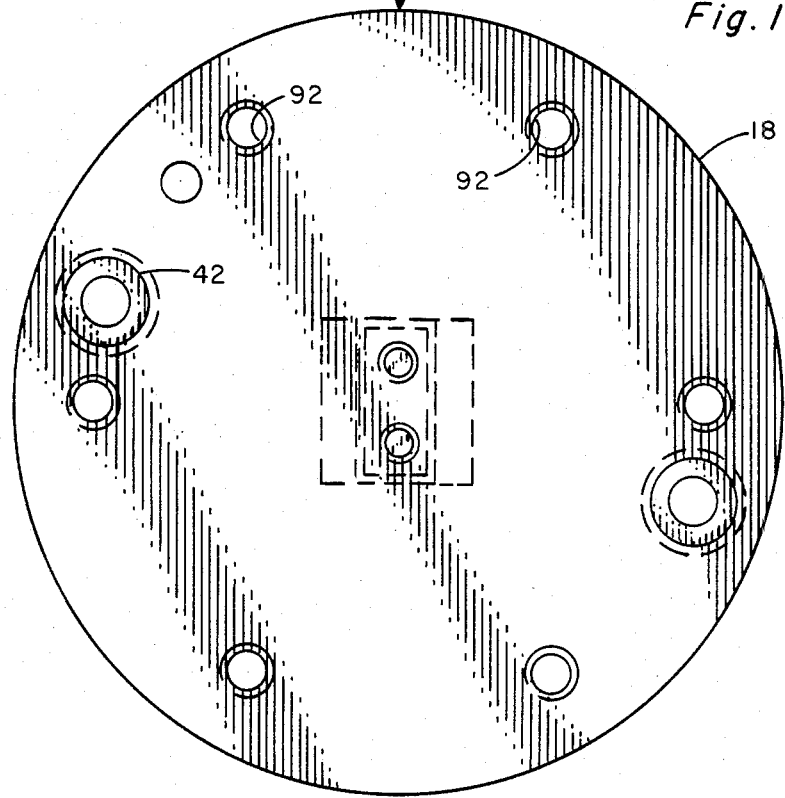
FIG. 9 is a front elevation view of the tool base with the tool removed for clarity.

FIGS. 9 and 10 depict the tool base 18 with the tool 19 removed, for clarity of viewing. The tool base 18 is a cylindrical plate, having the T-member 35 secured to it by locking screws 76, and a fluid port 89 is drilled through, in line with the O-ring 80 and front hole 50 of the adapter unit front plate 26. The tool base 18 has a pair of hardened, shouldered, bushings 42 received in mating bores 90 and counterbores 91 so the base 18 can be located on the locating pins 43,44 of the adapter unit 17 (see FIGS. 7 and 8). Tapped holes 92 are provided on the tool base 18 in a predetermined pattern so that a selected tool 19 may be affixed thereto.

As previously stated, the fluid ports 50 of the adapter unit 17 and tool base 18 are provided only for those tools 19 which need pressurized fluid for a motive source. FIG. 4 illustrates as an example electrical connectors 51,52 which might be employed when an electrical motive power source is needed. It may be appreciated that certain tools may need no power supplied to them and, in such case, the electrical and fluid connectors shown would be omitted.

While the invention has been shown in connection with a preferred embodiment, the invention is not limited to such embodiment, but rather extends to all such designs and modifications as come within the scope of the appended claims.

What is claimed is:
1. A robot toolchanger, comprising:
 (a) a housing, having spaced-apart front and rear plates rigidly connected to one another;
 (b) a central opening through said front plate;
 (c) a linear actuator mounted to said rear plate between said plates, and having a rod movable between extended and retracted end positions;
 (d) a linear slideway on said front plate, transverse to said central opening;
 (e) a locking slide carried in said slideway and affixed to said rod, said slide having an aperture alignable with said central opening, and further having means for engaging a tool retention member;
 (f) a toolbase having a tool retention member affixed thereto, said member insertable into said housing through said central opening and said slide aperture;
 (g) means for positioning said toolbase on said housing; and
 (h) means for positioning and securing said housing on a movable robot member.

2. The toolchanger of claim 1, wherein said tool retention member has a head portion and adjacent stem portion, said stem portion being smaller in cross-section than said head portion and located against said toolbase, and further wherein said slide means for engaging said tool retention member comprises a slide surface adjacent to said aperture for bearing against said head portion.

3. A robot toolchanger system, comprising in combination:
 (a) a movable robot member having a movable end effector;
 (b) a housing mounted to said end effector, said housing having spaced-apart front and rear plates rigidly connected to one another;
 (c) a central opening through said front plate;
 (d) a linear actuator mounted to said rear plate, between said plates, and having a rod movable transverse to said central opening between extended and retracted positions;
 (e) a linear slideway extending through said front plate, transverse to said central opening;
 (f) a linear slide carried in said slideway and affixed to said actuator rod and movable in accordance with said actuator movement between locking and unlocking positions, said slide further having an aperture alignable with said central opening and a ramp surface adjacent said aperture for engaging a tool retention member;
 (g) a toolbase having a tool retention member affixed thereto said member insertable into said housing through said central opening and said slide aperture;
 (h) means for positioning said toolbase on said housing; and
 (i) means for positioning and securing said housing on said movable end effector.

4. The toolchanger system of claim 3, wherein said tool retention member comprises a T-shaped member having its stem affixed to said toolbase, and having its crossbar formed with a ramp surface cooperating with said slide ramp surface, and further wherein said slide ramp surface is bifurcated to form a clearance slot for said stem.

* * * * *